(12) United States Patent
Sander et al.

(10) Patent No.: US 9,657,793 B2
(45) Date of Patent: May 23, 2017

(54) FRICTION LINING WITH A STEEL WIRE BOW SPRING

(71) Applicant: Continental Teves AG & Co. oHG, Frankfurt (DE)

(72) Inventors: Christoph Sander, Vienna (AT); Christian Piehler, Frankfurt (DE); Jochem Rausch, Essenheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/762,539

(22) PCT Filed: Jan. 30, 2014

(86) PCT No.: PCT/EP2014/051770
§ 371 (c)(1),
(2) Date: Jul. 22, 2015

(87) PCT Pub. No.: WO2014/118260
PCT Pub. Date: Aug. 7, 2014

(65) Prior Publication Data
US 2015/0362028 A1     Dec. 17, 2015

(30) Foreign Application Priority Data

Jan. 31, 2013   (DE) .......................... 10 2013 201 646
Aug. 21, 2013   (DE) .......................... 10 2013 216 592

(51) Int. Cl.
*F16D 65/097* (2006.01)

(52) U.S. Cl.
CPC ................. *F16D 65/0976* (2013.01)

(58) Field of Classification Search
CPC .. F16D 65/0973–65/0979; F16D 66/00; F16D 66/02; F16D 66/021–66/026
(Continued)

(56) References Cited

U.S. PATENT DOCUMENTS 4,344,509 A * 8/1982 Harmer ................. F16D 66/024
                                                    116/208
4,537,291 A   8/1985 Thiel
(Continued)

FOREIGN PATENT DOCUMENTS

DE           3220632         12/1983
DE           3445488          2/1986
(Continued)

OTHER PUBLICATIONS

German Search Report for German Application No. 10 2013 216 592.7 mailed Sep. 9, 2013, including partial translation.
(Continued)

Primary Examiner — Vishal Sahni
(74) Attorney, Agent, or Firm — RatnerPrestia (57) ABSTRACT

A friction lining with a wire bow spring including leg springs for the radially elastic support of the friction lining on a housing bridge of a brake caliper, wherein the back plate has a receptacle for a friction-lining wear sensor, and wherein a steel wire bow spring is a symmetrical to at least one longitudinal axis, and the wire bow spring is symmetrical to an imaginary transverse axis arranged rotated by a 90° with respect to the longitudinal axis, wherein the steel wire bow has a central U-bow for the friction-lining wear sensor, and wherein the U-bow is designed to be open at the top, the friction-lining wear sensor is accommodated integrated in the central U-bow and the U-bow is substantially larger than the friction-lining wear sensor, and therefore the friction-lining wear sensor can be mounted in the radial direction in the receptacle in the back plate.

14 Claims, 9 Drawing Sheets

(58) Field of Classification Search
USPC .............................. 188/1.11 R, 1.11 W, 73.38
See application file for complete search history.

(56) References Cited

U.S. PATENT DOCUMENTS

| | | | | |
|---|---|---|---|---|
| 4,577,731 | A * | 3/1986 | Burgdorf | F16D 55/2265 188/73.33 |
| 4,643,277 | A * | 2/1987 | Bangert | F16D 66/024 188/1.11 W |
| 4,742,326 | A * | 5/1988 | Gregoire | F16D 65/0977 188/1.11 L |
| 5,048,645 | A * | 9/1991 | Thiel | F16D 66/024 116/208 |
| 5,662,191 | A * | 9/1997 | Le Deit | F16D 65/092 188/1.11 L |
| 5,678,662 | A * | 10/1997 | Giorgetti | F16D 66/02 188/1.11 W |
| 5,839,545 | A * | 11/1998 | Preston | F16D 66/024 188/1.11 L |
| 6,957,724 | B2 | 10/2005 | Gherardi | |
| 2009/0211857 | A1 * | 8/2009 | Camilo-Martinez | F16D 65/0978 188/250 B |
| 2010/0000826 | A1 * | 1/2010 | Wille | F16D 66/027 188/1.11 W |
| 2010/0258384 | A1 * | 10/2010 | Kreuzeder | F16D 65/0976 188/1.11 L |

FOREIGN PATENT DOCUMENTS

| | | |
|---|---|---|
| DE | 8503491 | 6/1986 |
| DE | 4303961 | 8/1994 |
| DE | 10019654 | 10/2001 |
| DE | 10333420 | 1/2005 |
| EP | 0610919 | 4/1994 |
| GB | 2170873 | 8/1986 |
| JP | S58109737 | 6/1983 |
| JP | S6138237 | 2/1986 |
| JP | S6256635 | 3/1987 |
| JP | H0968244 | 3/1997 |
| JP | 2004501321 | 1/2004 |

OTHER PUBLICATIONS

International Search Report for International Application No. PCT/EP2014/051770 mailed Apr. 10, 2014.

* cited by examiner

FRICTION LINING WITH A STEEL WIRE BOW SPRING

CROSS REFERENCE TO RELATED APPLICATIONS

This application is the U.S. National Phase Application of PCT International Application No. PCT/EP2014/051770, filed Jan. 30, 2014, which claims priority to German Patent Application No. 10 2013 201 646.8, filed Jan. 31, 2013 and German Patent Application No. 10 2013 216 592.7, filed Aug. 21, 2013, the contents of such applications being incorporated by reference herein.

FIELD OF THE INVENTION

The invention relates to a friction lining having a steel wire bow spring which serves by way of spring legs for the radially elastic support of the friction lining on a housing guide rail of a brake caliper, the spring being fastened to a rear plate of the friction lining, and, furthermore, the rear plate having a receptacle for a friction lining wear sensor for wear detection in a partially lined disk brake.

BACKGROUND OF THE INVENTION

DE 100 19 654 A1, which is incorporated by reference, has disclosed a disk brake having a brake caliper which reaches around the brake disk radially from the inside in the direction of radially to the outside and has a friction lining wear sensor and a shaped spring which is wound from wire for radial suspension of the brake lining. Here, the shaped spring is supported on the brake caliper in such a way that the friction lining is held such that it is pressed radially to the inside. The shaped spring is arranged radially above the friction lining, takes up a comparatively large amount of space, reduces the brake disk diameter which can be utilized and also impedes central, radially inwardly directed mounting of the friction lining wear sensor. This is considered to be disadvantageous because the construction complicates both mounting and maintenance. The maximum brake disk diameter which can be utilized is reduced. In addition, the known shaped spring is positioned in a manner which is unfavorable in terms of corrosion.

Furthermore, friction linings with radial suspension means are known, in which a fracture of a spring leg leads to the spring function being lost.

SUMMARY OF THE INVENTION

An aspect of the present invention eliminates the deficiencies of the prior art and provides a suspension means which saves installation space for a modern disk brake system which, furthermore, permits simple and space-saving integration of a friction lining wear sensor, facilitated mounting of the components additionally being made possible.

This aspect is achieved by way of a design which is condensed in an integrated manner by the steel wire bow having a winding rotational direction which changes multiple times in three-dimensional terms, the wire bow spring being of asymmetrical configuration in relation to at least one imaginary longitudinal axis, the wire bow spring being of symmetrical configuration in relation to at least one imaginary transverse axis which is arranged rotated by 90° with respect to the longitudinal axis, and the wire bow spring having a central U-bow for supporting on the rear plate and for receiving the friction lining wear sensor, and the U-bow being configured so as to be open at the top in such a way that the friction lining wear sensor is received in an integrated manner in the central U-bow, and the U-bow being provided so as to be substantially larger than the friction lining wear sensor, with the result that the friction lining wear sensor can be mounted in the radial direction in a receptacle of the rear plate. One special advantage of the invention lies in the fact that the correct, positionally correct mounting of the involved components on one another is obtained to a certain extent automatically because positionally incorrect mounting is ruled out structurally.

An aspect of the invention therefore consists of the basic concept that said steel wire spring is inserted to a certain extent as connecting, intermediate or bridge element between the rear plate and the friction lining wear sensor and is fastened to the rear plate, and the wire spring having a receptacle for the friction lining wear sensor in a similar manner to the rear plate. An additional advantage of the invention consists in the fact that the friction lining, spring and friction lining wear sensor can be provided particularly inexpensively and nevertheless in an adapted manner by the respective component manufacturers, and can be fed in without errors for mounting in the system. Separate fastening means, such as, in particular, pins, rivets or screws, are neither required nor effective between the spring, rear plate and sensor, because the means for bringing about a holding function are integrated into the respective involved components. A particularly space-saving construction is proposed by way of spatial integration (in particular, mutual spatial overlapping of the involved components in the radial direction), by way of which space-saving construction the invention makes it possible in the brake system to provide particularly large brake disk diameters. In this context, the mounting direction for the wear sensor and the mounting direction for the wire spring are oriented in relation to the rear plate in each case in a uniformly radially directed manner in relation to the rear plate. Even if one of the spring legs of the wire bow spring should break for any reasons, the other spring leg continues to fulfill the desired spring action (redundant spring action).

Particularly simple and machine-suitable bend-shaping of the wire bow spring with stable support on the rear plate is obtained if a central elastic U-bow is provided with a U-base and with two U-limbs which emanate therefrom, in each case one resilient spring limb being provided on each U-bow for radially sprung contact on the housing guide rail.

The elastic durability of the wire bow spring is improved further by each spring limb of the steel wire bow being assigned a dedicated spring winding, and the rotational direction of the spring windings being provided such that it is in each case different, that is to say reversed, with respect to one another.

For a stress profile which is free from notch effects, it is provided that the steel wire bow has an S-shaped curvature in each case between the spring winding and the U-limb. The support of the wire bow spring is improved further if the S-shaped curvature bears tightly at least partially against a curved seat of the rear plate, or rests on the seat.

An axially directed pitch of the spring windings is advantageously dimensioned in such a way that the adjacent winding sections are provided at an axial spacing from one another without contact with one another. The rear plate can be provided with seats for receiving the spring windings, which seats are positioned laterally next to the receptacle for the friction lining wear sensor. In the region of said seats, the rear plate is provided with a thickness which is dimensioned so as to be slightly greater than the axial spacing between adjacent winding sections. As a result, it is made possible to a certain extent to clamp the wire bow spring elastically, that is to say releasably, onto the seats of the rear plate using its windings.

In order to save installation space, it is recommended that the pitch of the spring windings is dimensioned to be limited in such a way that the spring bow, as viewed in the axial direction, does not axially protrude beyond the thickness of the rear plate. Accordingly, it is reliably ruled out that the wire bow spring is ground through even in the case of a completely worn friction material.

To a certain extent, the spring bow has a design which is offset axially and is arranged in a plurality of "planes". To this end, each fundamentally planar U-bow adjoins the friction lining-free rear side of the rear plate. In contrast, the spring legs are positioned in a region of the rear plate which adjoins the friction lining compound. Each winding runs with a pitch in the axial direction, is clamped on the associated seat of the rear plate, and in each case connects an S-curvature to in each case one spring leg. For improved support, each seat can be adapted in a concave or convex manner to sections of the wire bow spring.

BRIEF DESCRIPTION OF THE DRAWINGS

Further details of the invention are apparent from the following description using the drawing.

DETAILED DESCRIPTION OF THE PREFERRED EMBODIMENTS

A disk brake of the partially lined type for motor vehicles in principle comprises a brake caliper (not shown), in particular a claw caliper with at least one actuator (piston) which presses at least one friction lining 1 directly into contact with a brake disk. To this end, each friction lining comprises a rear plate 2 and a wearing friction material 3. Reaction forces serve for indirect actuation of a second, claw finger-side friction lining, by the claw caliper being mounted fixedly in the disk rotational direction but such that it can be displaced parallel with respect to a wheel rotational axis, relative to a holder which is fixed on the vehicle. The friction linings 1, 1b are received in the holder such that they are secured against rotation and can be displaced axially. Another possible disk brake design relates to the fixed caliper brakes, in which both brake linings are immediately loaded directly by at least two separate actuators (pistons) of a brake caliper, the brake caliper being arranged such that it is fixed to the vehicle. A common feature in principle of both brake caliper types is that in each case both friction linings 1 are suspended such that they are prestressed elastically in the radial direction R, in order to avoid vibration leading to rattling noises. Here, the radial suspension can be positioned in each case between the brake caliper, in particular of a housing guide rail and the friction lining 1, 1b, in such a way that the friction lining 1, 1b is permanently placed elastically radially to the inside against a support in the shaft of the housing, or else radially elastically against an associated holding and guiding system in the associated holder. In principle, however, it is also possible to provide merely one of the friction linings 1 with a wire bow spring according to the invention, in order to suspend the other friction lining by way of other means.

For this purpose, a wire bow spring 4 according to the invention has two redundant spring legs 5, 6 which are bent away such that they are directed substantially in a diametrically opposed manner with respect to one another and project freely on the end side, for radially sprung contact with a housing guide rail of the brake caliper. A dedicated, helical spring winding 7, 8 which is configured with a predefined pitch P is connected in front of each of the spring legs 5, 6, which spring winding 7, 8 makes at least approximately one complete spring winding and ensures the necessary elastic compliance. This positioning of two separate spring windings 7, 8 provided next to one another saves installation space in the radial direction because the winding diameter which can be of comparatively small configuration causes a reduced installation space requirement in comparison with a single winding of comparatively large dimensions.

Figure 1:
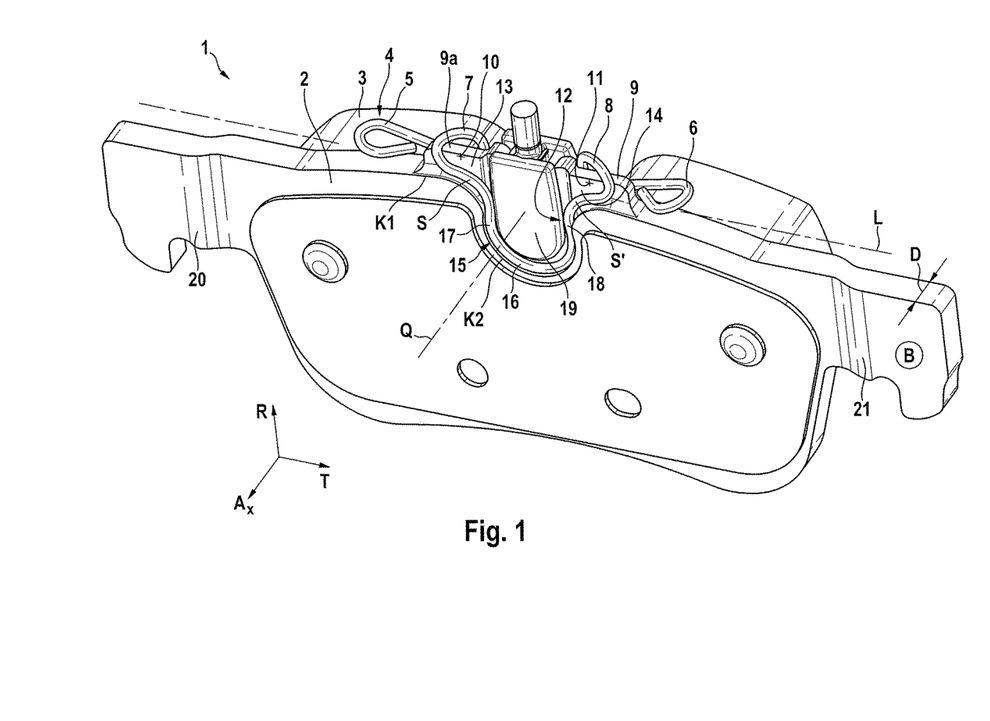

A further favorable contribution to installation space is achieved by at least a large part of the spring windings 7, 8 which are positioned next to one another being present at the same time next to a cam 9 of the rear plate 2 which is arranged above the friction material 3. This condensing promotes powerful brake systems with large brake disk diameters. An embodiment with additional spring windings, or parts thereof, is likewise possible. In the preferred embodiment (FIG. 1), a spring winding 7 which is connected to the left of the U-bow 15 has a rotational direction in the clockwise direction to the right, whereas the spring winding 8 which is connected to the right of the U-bow has a rotational direction counter to the clockwise direction to the left. In these embodiments of the invention, the rotational direction of the spring windings 7, 8 is arranged in relation to the loading such that the flexural loading which is initiated radially via the spring leg 5, 6 leads during operation to bending open of the spring winding 7, 8, that is to say the spring loading runs in a manner which is directed counter to the rotational direction of the spring winding 7, 8 and the spring constituent parts are pressed for support into the seat 13, 14 which is formed. The spring winding 7, 8 is therefore bent open during operation, in other words is widened. As a result, radially elastic, free deformation of the spring legs 5, 6 in the radial direction is made possible with a simultaneously low installation space requirement for the wire bow spring and improved spring support. Although a U-bow is mentioned above, it is in principle possible to modify its shape and to adapt it to requirements.

Figure 2:
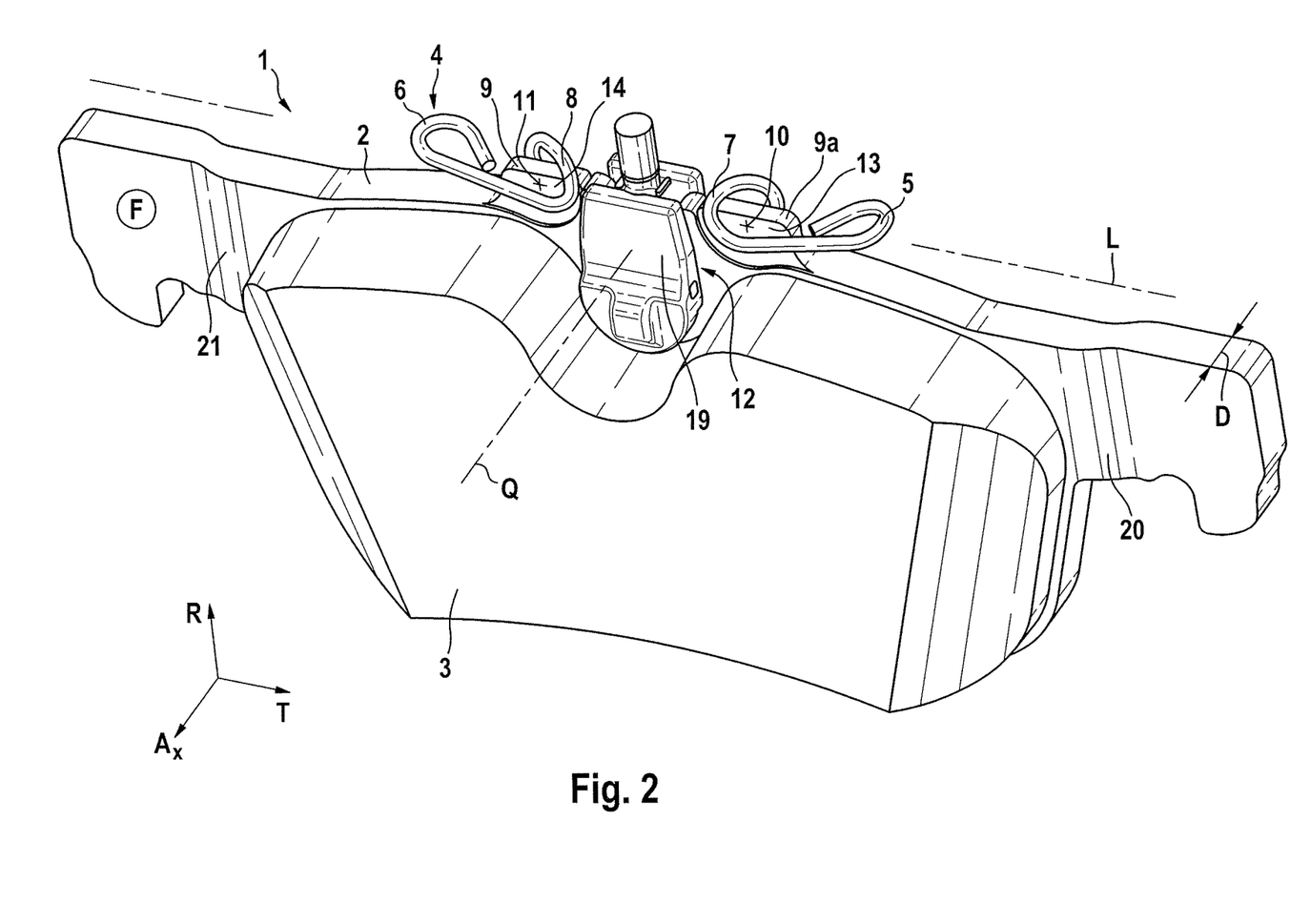
Figure 3:
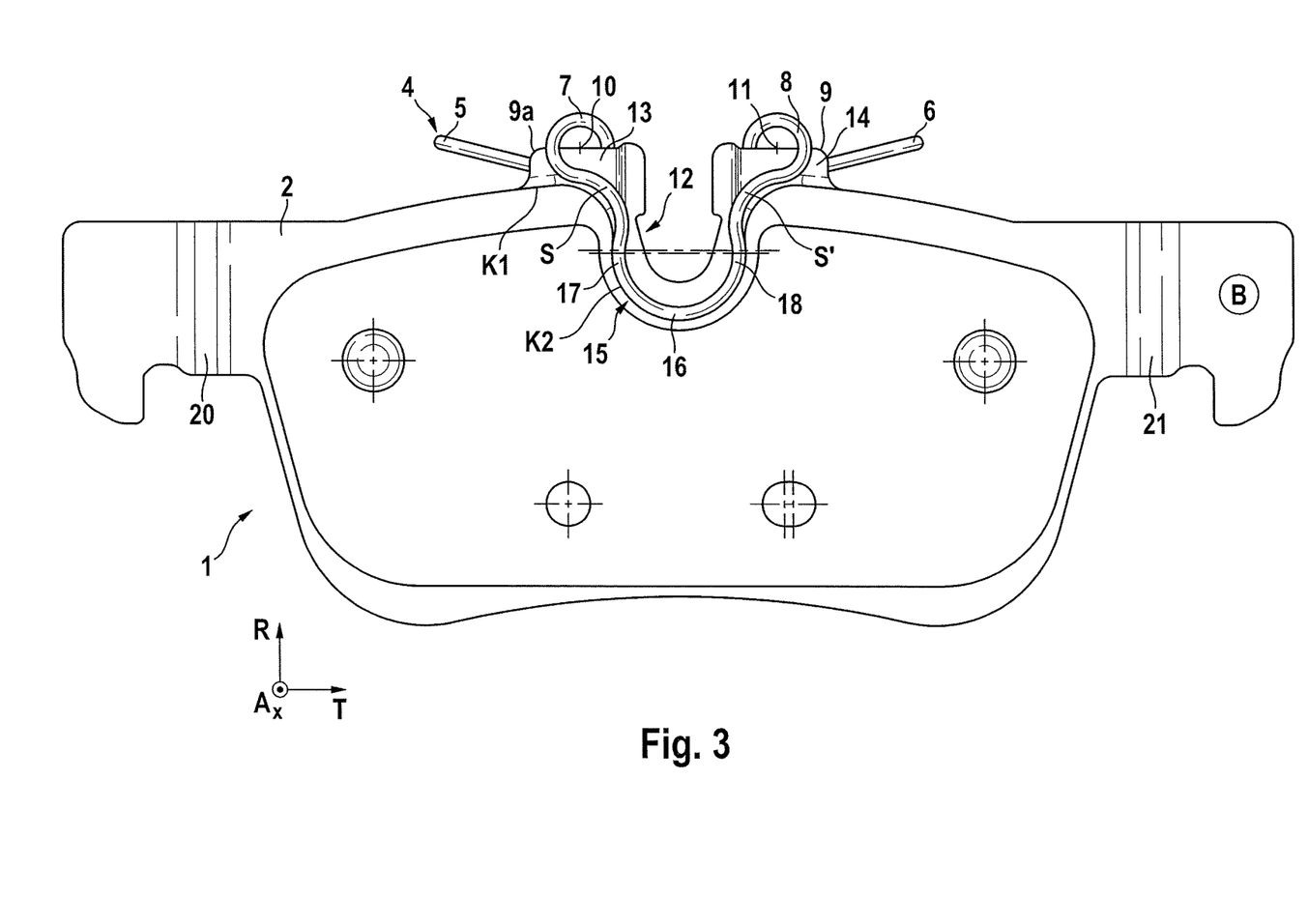
Figure 4:
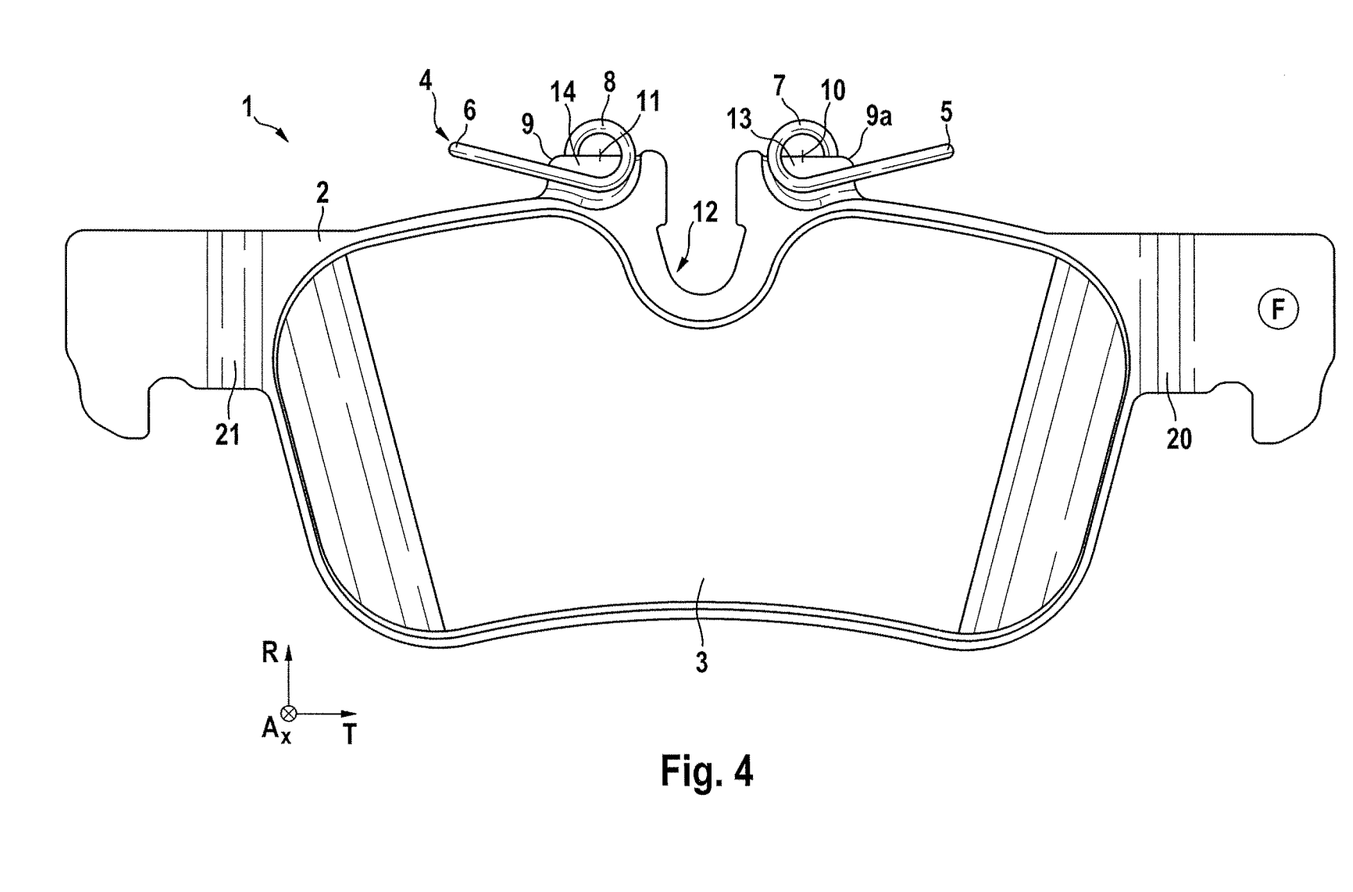

In the first embodiment (see FIG. 2), each spring leg 5, 6 is provided such that it is branched off in relation to the winding center point 10, 11 not radially at the top (12 o'clock position) but rather radially at the bottom (6 o'clock position). The operationally induced, radially directed, elastic deformation with bending open of the spring winding 7, 8 reinforces radial contact and bearing between U-leg 17, 18 and (sensor) receptacle 12 on the rear plate 2.

The spring winding 7, 8 can additionally serve for elastically clamping, and releasable, fastening of the wire bow spring 4 to the fastening section of the rear plate 2. To this end, the special, helical pitch P of the spring winding 7, 8 opens a slot-shaped opening for being pushed into by the cam 9. As a result, it is made possible to push the wire bow spring 4, under elastic deformation of spring winding sections, onto the plate-shaped cam 9/seat of the rear plate 2 in a radially directed manner such that the spring winding sections of each spring winding 7, 8 clamp the cam 9/seat 13, 14 elastically between one another. To this end, the elastic clamping action of the winding sections is provided such that it is directed substantially axially, that is to say parallel to a brake disk rotational axis. Each of the spring windings 7, 8 can therefore fulfill a dual function, by the fastening/holding function being made possible at the same time and the necessary radial elasticity being brought about by the respective spring leg 5, 6.

Figure 9:
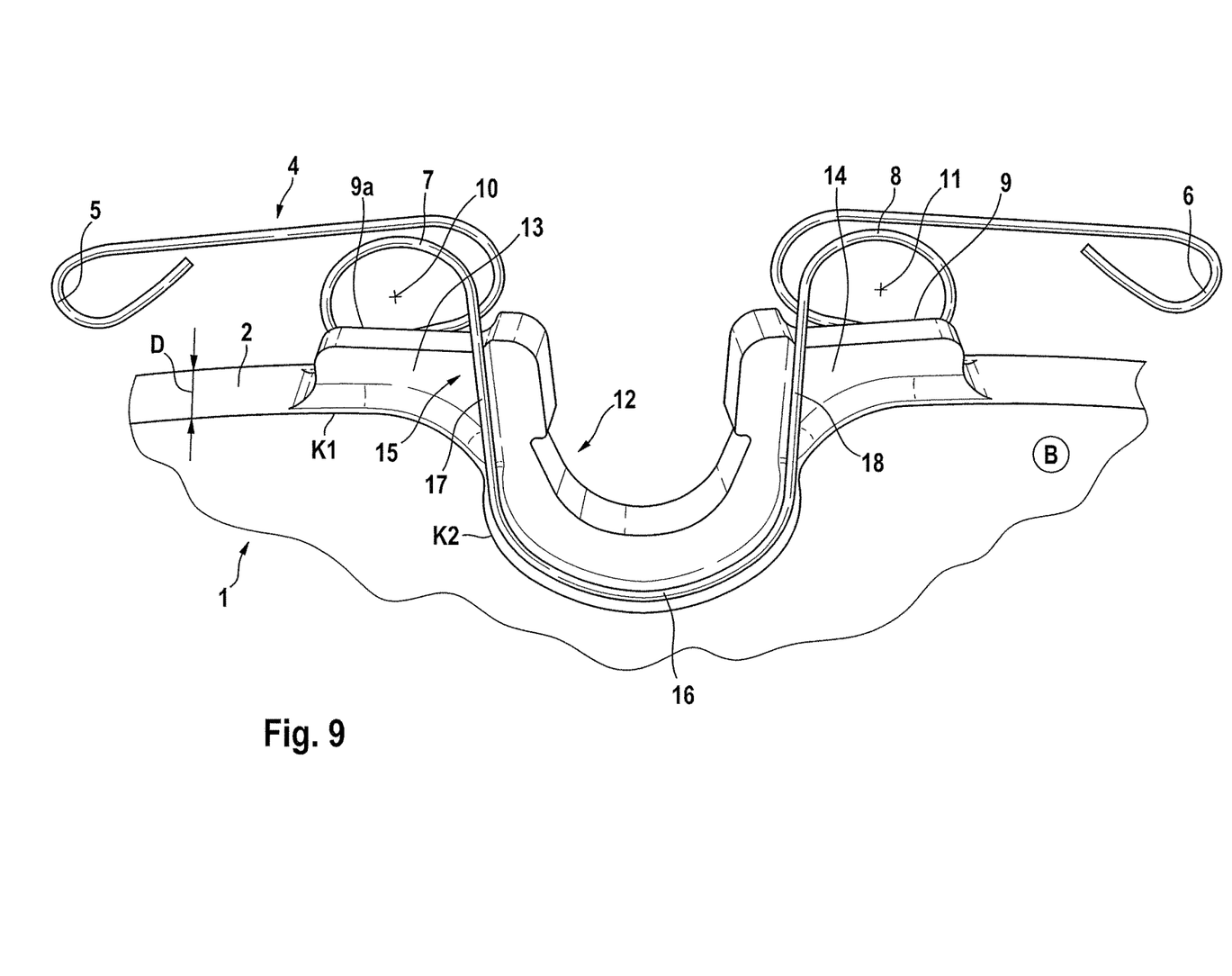

Another embodiment of the wire bow spring 4 (FIG. 9) makes a design possible of the spring winding 7 which is positioned on the left of the U-leg 17, starting from the U-bow 15, counter to the clockwise direction, that is to say in the rotational direction to the left. Accordingly, the spring winding 8 which is positioned on the right of the U-leg 18 is provided such that it is wound to the right. This construction makes it possible for the spring bow to adjoin the winding in the 12 o'clock position, the spring windings 7, 8 being bent "closed" to a certain extent under the elastic spring loading of the spring legs 5, 6. Here, a large part of the spring winding 7, 8 is arranged on the side of the friction material 3.

In principle, the rear plate 2 has a nominally predefined sheet metal thickness (nominal sheet metal thickness) which can be configured so as to be reshaped, thickened, in the thickness direction, in particular in the region of tangentially directed, hammerhead-like projections 20, 21 of the rear plate 2, in order to achieve an increased strength by way of any multiple of the nominal sheet metal thickness (and by way of work hardening). For improved mounting of the wire bow spring 4 on the rear plate 2, however, it is appropriate if each cam 9, 9a/seat 13, 14 has a thickness which is reduced, that is to say elongated, proportionally with respect to the sheet metal thickness D. Furthermore, it is possible in principle to provide each seat 13, 14 with additional means, such as, in particular, with insertion bevels for simplified mounting, and/or with additional securing or holding means which can avoid undesired release movement between the wire bow spring 4 and the rear plate 2. To this end, cams can have wedge-shaped projections, undercuts and/or other profiles and combinations thereof on the surface of the holding projection.

Figure 5:
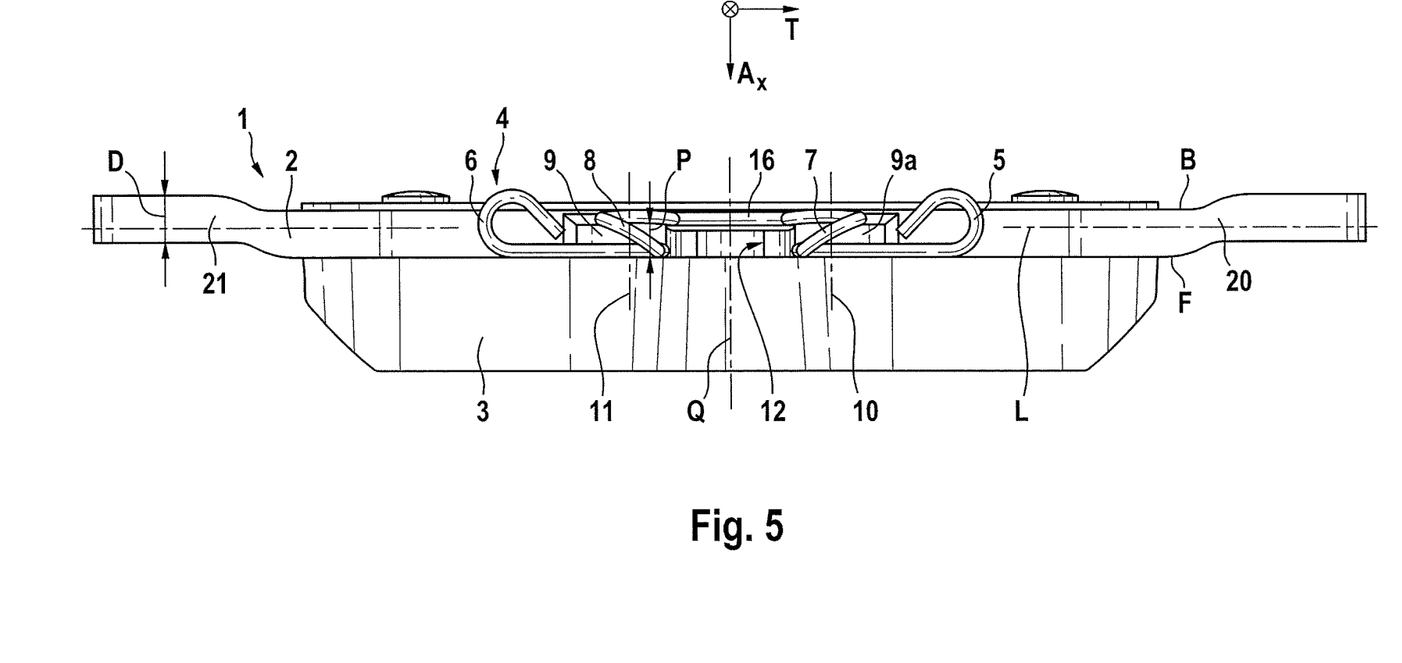
Figure 6:
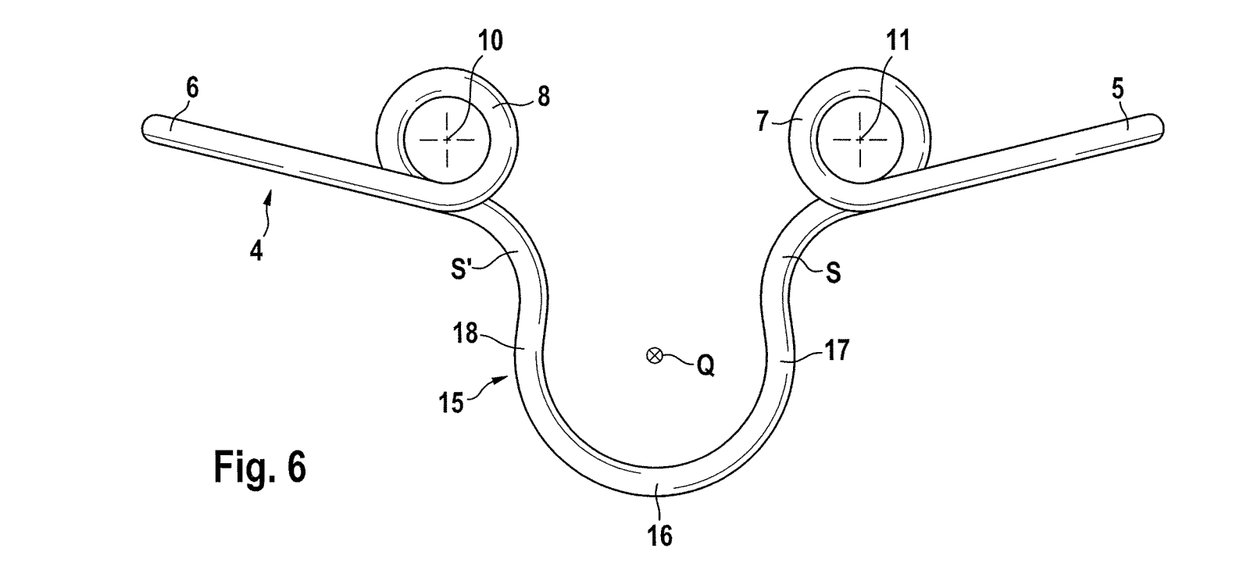
Figure 7:
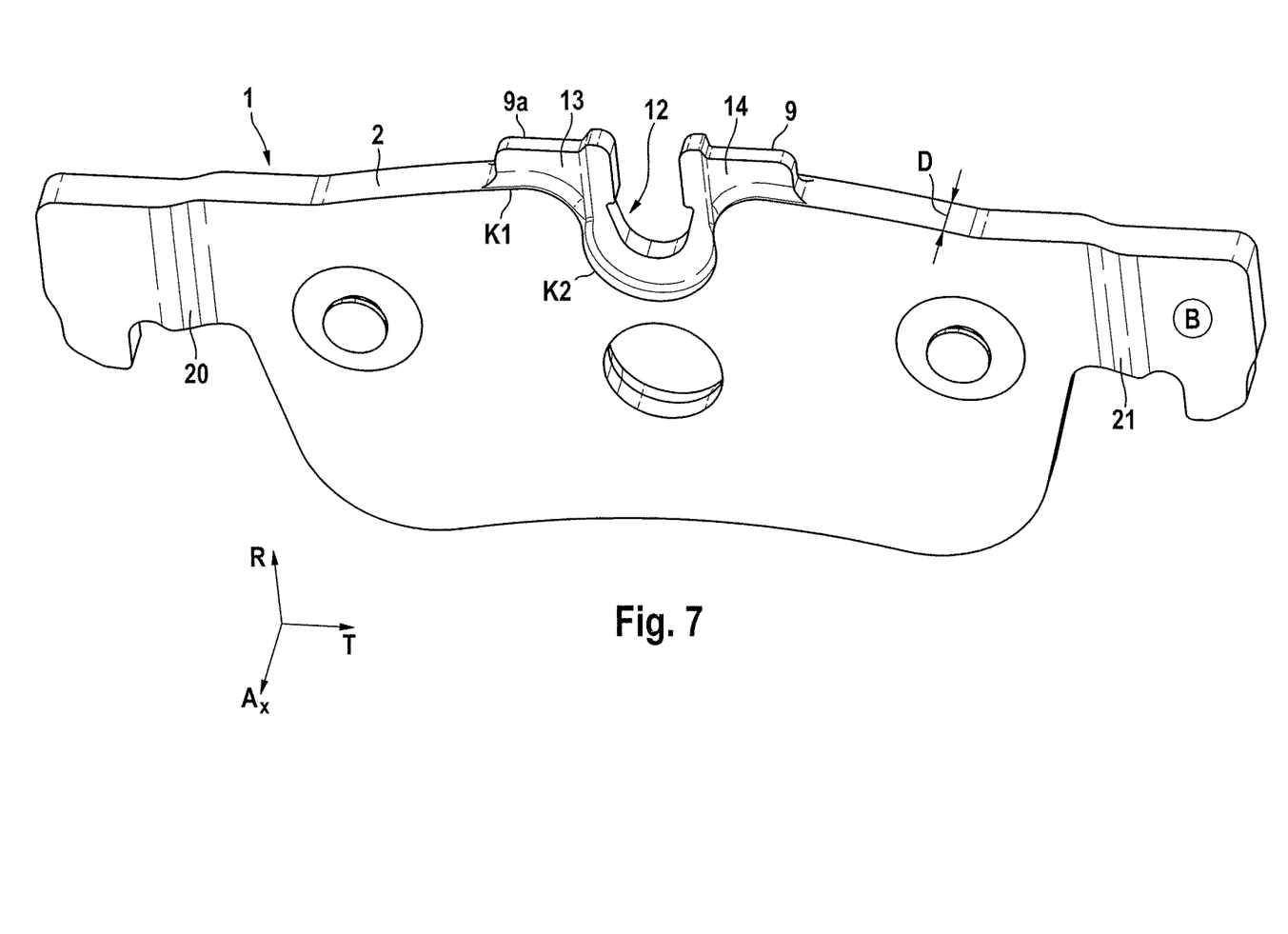
Figure 8:
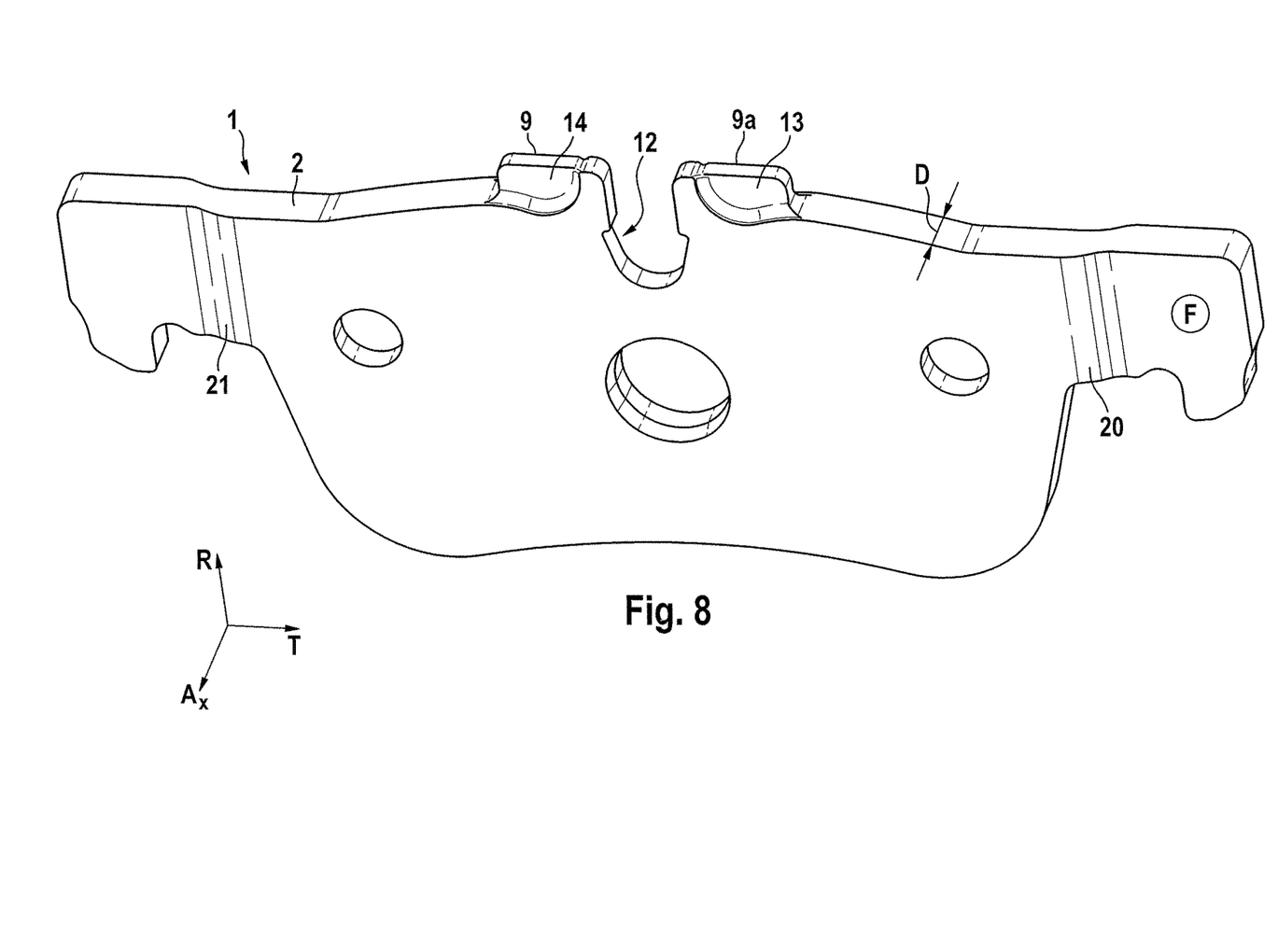

The wire bow spring 4 is symmetrical with respect to a radial imaginary vertical axis in a side view (FIG. 6). The plan view (FIG. 5) of the wire bow spring 4 shows that it substantially does not protrude laterally beyond the sheet metal thickness D of the rear plate 2 and is of asymmetrical configuration with respect to the longitudinal axis L. The axially condensed design ensures that contact or frictional operations cannot occur between the wire bow spring 4 and the brake disk or brake piston. Said wire bow spring 4 which is of asymmetrically curved configuration furthermore necessarily makes error-avoiding, positionally correct mounting possible, together with its correspondingly asymmetrically adapted receptacle on the rear plate 2, as will be explained in the following text using the U-limb 17, 18.

The support points of the spring legs 5, 6 for elastic contact with a housing guide rail are arranged in the rear plates 2 which are configured so as to be angled off twice in the projections 20, 21, in such a way that they are positioned in central alignment with the associated mounting and support of the rear plate 2 in the brake holder. As a result, the advantage is achieved that an ideal prestressing action on the friction linings 1, which prestressing action is free from tilting moments and is directed radially, is made possible. In other words, the tendency to tilt and diagonal wear are avoided.

The central middle section (U-bow 15) of the wire bow spring 4 is configured so as to be open radially to the outside and curved in a substantially U-shaped manner. The U-bow 15 comprises a U-base 16 and U-limbs 17, 18 which connect the two opposed spring legs 5, 6 including the spring winding 7, 8 to one another at a predefined spacing. One substantial advantage of said wire bow spring 4 consists in that it can be fastened to the friction lining 1 before mounting of the friction lining wear sensor, with the result that subsequent sensor mounting is not impeded. This is because the wire bow spring 4 in its specific configuration of the U-limbs 17, 18 follows an outer contour of the housing of the respective friction lining wear sensor 19 in the broadest sense, with the result that the latter can be received reliably and can be pushed without problems, even in the radial direction, into its receptacle on the rear plate 2, without it being necessary to remove or deform the wire bow spring 4. Together with the specially shaped contour of the U-limbs 17, 18 of the wire bow spring 4, this, in conjunction with an outer contour of the associated housing of the friction lining wear sensor 19, makes positionally correct mounting of the friction lining wear sensor 19 possible. Together with the associated receptacle on the rear plate 2, the asymmetrical (in plan view) arrangement of the U-limbs 17, 18 makes error-avoiding mounting possible. This is because a positionally reversed pairing between the friction lining 1 and the wire bow spring 4 is ruled out reliably in a structural, that is to say automatic, manner.

The wire bow spring 4 can be supported in a punctiform and/or full-area manner over radii on the receptacle 12/seat of the rear plate 2 which is designed as a corresponding part. To this end, the wire bow spring 4 has at least three bending radii which are assigned corresponding parts in the receptacle 12 for the introduction of force. The elastic deformation of the spring limbs 5, 6 in the radial direction R makes unavoidable non-positive securing in the receptacle 12 possible. In one development of the invention, it can be provided on the rear plate 2 that the seat 13, 14 has a depressed receptacle for the U-limb 17, 18 with an undercut. If the U-limbs 17, 18 are oriented in an antiparallel manner with respect to one another, by there being an elastic, omega-shaped overbend of the two U-limbs 17, 18 in the tangential direction T, an additional holding action against undesired withdrawal of the wire bow spring 4 can be made possible as a result. The preferred embodiment shows in the figure that the seat 13, 14 on that rear side B of the rear plate 2 which faces away from the friction lining is convexly shaped in the region K1, in order to support the S-curvature of the wire bow spring 4. In contrast, the bends of the spring windings 7, 8 are received on that front side F of the rear plate 2 which faces the friction lining in the region K2 of the seats 13, 14 in concave shaped-out formations.

According to the invention, a supplier module which is preassembled, secured captively and comprises a friction lining 1 with radial suspension including value-added function is made possible, by subsequent and simplified, radially directed, error-free mounting of the wear sensor 19 being provided at the same time. This makes simplified logistics and mounting possible for supplier companies, vehicle manufacturers, the consumable parts market, and for maintenance in the automotive field.

The U-bow 15 with U-limbs 17, 18 makes stable, flat fastening and support possible for tilt-proof support of the wire bow spring 4 on the rear plate 2 in relation to the various spatial axes.

It goes without saying that the rear plate 2 has correspondingly adapted receptacles 12 and cams 9, 9a/seats 13, 14 and fastening sections for receiving the friction lining wear sensor 19 and wire bow spring 4. These include, in particular, a receptacle 12 for the U-bow 15 with U-limbs 17, 18, which receptacle 12 is cut into the sheet metal thickness correspondingly. Furthermore, seats 13, 14 for the spring windings 7, 8 are recommendable, which seats 13, 14 are provided such that their thickness is elongated, that is to say reduced, in line with requirements. Said seats 13, 14 are at least partially a constituent part of cams 9, 9a which protrude radially to the outside beyond the contour of the friction material 3.

It is to be added that it goes without saying that sufficient clearance in the region of the seats is allowed for the spring windings 7, 8, in order that elastic deformation of the spring legs 5, 6 can be carried out without obstruction.

LIST OF DESIGNATIONS

1 Friction lining
2 Rear plate
3 Friction material
4 Wire bow spring
5 Spring leg
6 Spring leg
7 Spring winding
8 Spring winding
9, 9a Cam
10 Winding center point
11 Winding center point
12 Receptacle
13 Seat
14 Seat
15 U-bow
16 U-base
17 U-limb
18 U-limb
19 (Friction lining) wear sensor
20 Projection
21 Projection
S, S' Curvature
P Pitch
D Sheet metal thickness
L Longitudinal axis
Q Transverse axis
Ax Axial direction (parallel to the brake disk rotational axis)
R Radial direction
T Tangential direction
K1 Region
K2 Region
F Front side (on the friction lining side)
B Rear side (facing away from the friction lining)

The invention claimed is:

1. A friction lining comprising:
a wire bow spring which serves by way of spring legs for the radially elastic support of the friction lining on a housing guide rail of a brake caliper,
the wire bow spring being fastened to a rear plate of the friction lining, and, furthermore, the rear plate having a receptacle for a friction lining wear sensor for wear detection in a motor vehicle partially lined disk brake,
wherein the wire bow spring is of asymmetrical configuration in relation to at least one imaginary longitudinal axis, in that the wire bow spring is of symmetrical configuration in relation to at least one imaginary transverse axis Q which is arranged rotated by 90° with respect to the longitudinal axis L, the wire bow spring has a central U-bow for receiving the friction lining wear sensor and the central U-bow being configured so as to be open at the top with no portion of the wire bow spring crossing over the top of the central U-bow or extending between U-limbs of the central U-bow in such a way that the friction lining wear sensor is received in an integrated manner in the central U-bow and the central U-bow being provided so as to be substantially larger than the friction lining wear sensor, with the result that the friction lining wear sensor can be mounted in the receptacle of the rear plate in a positionally correct manner in the radial direction (R), wherein each of the spring legs is connected to a respective U-limb of the central U-bow, and
at least one helical spring winding is provided between each of the spring legs and the respective U-limb of the central U-bow.

2. The friction lining as claimed in claim 1, wherein at least one spring winding with a predefined pitch (P) and with a plurality of windings is provided in each case between each spring leg and each U-limb.

3. The friction lining as claimed in claim 2, wherein the spring windings of the wire bow spring in each case have a different rotational direction with respect to one another.

4. The friction lining as claimed in claim 1 wherein a steel wire bow is provided which has an S-shaped curvature between each spring winding and each U-limb.

5. The friction lining as claimed in claim 4, wherein the S-shaped curvature is seated at least partially on a seat of the rear plate.

6. The friction lining as claimed in claim 5, wherein the seat has a concavely shaped region (K1) for receiving a spring winding and a convexly shaped region (K2) for supporting the S-curvature.

7. The friction lining as claimed in claim 2, wherein the spring windings are configured with a pitch (P), which is predefined in an axially directed manner, in such a way that adjacent winding sections are provided at an axial spacing from one another without contact with one another.

8. The friction lining as claimed in claim 7, wherein the pitch (P) of the spring windings is provided in such a way that the steel wire bow substantially does not protrude in the axial direction (Ax) beyond the thickness (D) of the rear plate.

9. The friction lining as claimed in claim 7, wherein the rear plate is configured in the region of the seats with a thickness (D) which is dimensioned so as to be slightly greater than the axial spacing between adjacent winding sections, with the result that each spring winding is clamped elastically onto the associated seat.

10. The friction lining as claimed in claim 1, wherein the central U-bow is arranged on a friction lining-free rear side (R) of the rear plate, and the spring legs are arranged on the spring windings in each case on a friction lining-side front side (F).

11. The friction lining as claimed in claim 1, wherein the two U-limbs of the central U-bow are provided so as to be inclined antiparallel with respect to one another in such a way that the two U-limbs are at a smaller spacing from one another in the region of their transition to the S-shaped curvature than in a wire bow section which is provided in front of the transition and closer to a U-base.

12. The friction lining as claimed in claim 1 wherein the wire bow spring and the friction lining wear sensor are fastened to the rear plate such that they can be released independently of one another, in a non-positive manner.

13. The friction lining as claimed in claim 8, wherein the rear plate is configured in the region of the seats with a thickness (D) which is dimensioned so as to be slightly greater than the axial spacing between adjacent winding sections, with the result that each spring winding is clamped elastically onto the associated seat.

14. The friction lining as claimed in claim 3, wherein the spring windings are configured with a pitch (P), which is predefined in an axially directed manner, in such a way that adjacent winding sections are provided at an axial spacing from one another without contact with one another.

* * * * *